Nov. 2, 1926.

O. C. MORONEY 1,605,133

LIQUID MEASURING DEVICE AND SPRAYER

Filed Oct. 23, 1922   3 Sheets-Sheet 1

INVENTOR.
OLIVER C. MORONEY

BY White Prost Evans
his ATTORNEYS.

WITNESS

Nov. 2, 1926.  
O. C. MORONEY  
1,605,133  
LIQUID MEASURING DEVICE AND SPRAYER  
Filed Oct. 23, 1922  3 Sheets-Sheet 2

INVENTOR.
OLIVER C. MORONEY
BY White Prost Evans
his ATTORNEYS.

WITNESS

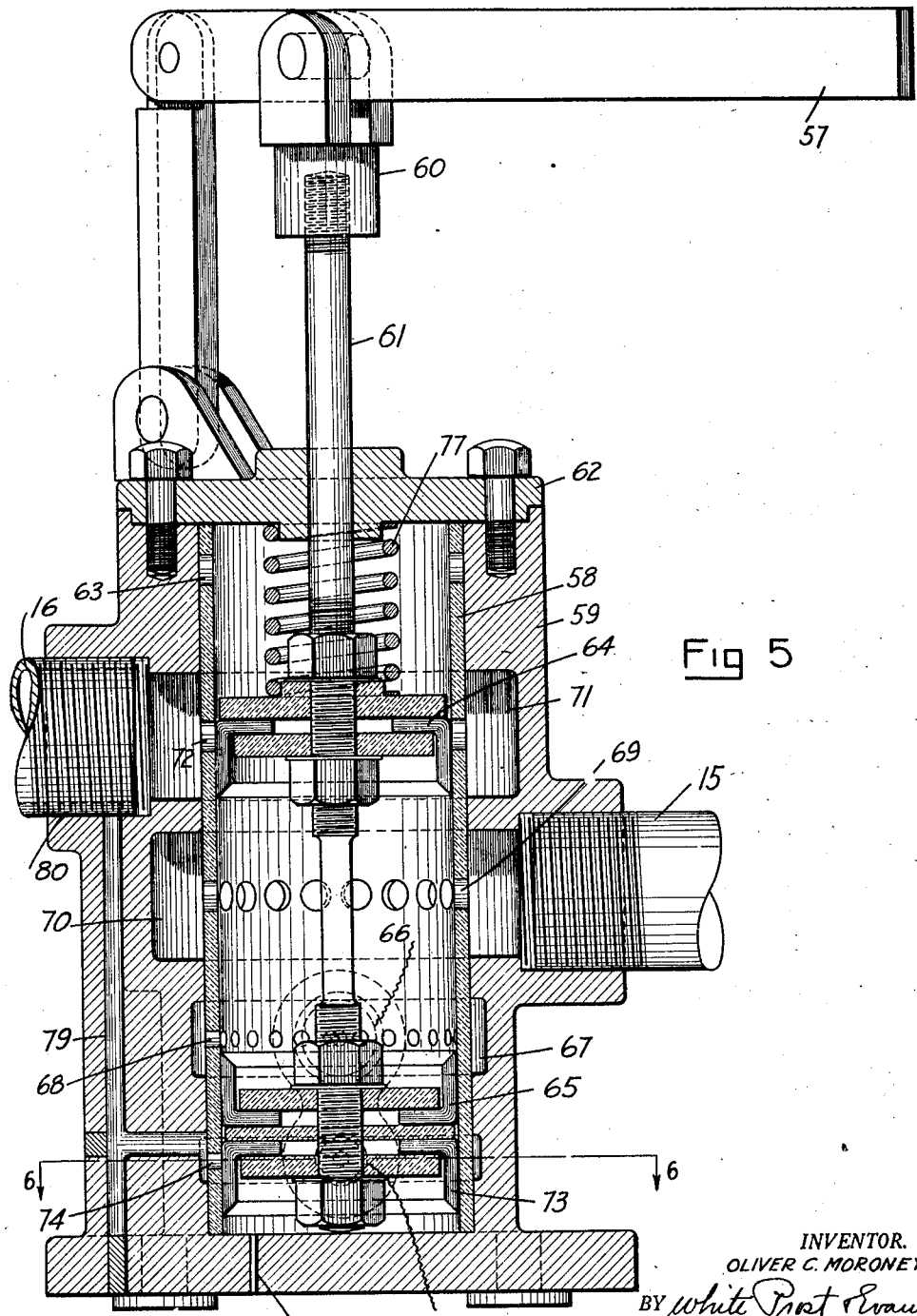

Patented Nov. 2, 1926.

1,605,133

UNITED STATES PATENT OFFICE.

OLIVER C. MORONEY, OF SAN FRANCISCO, CALIFORNIA.

LIQUID-MEASURING DEVICE AND SPRAYER.

Application filed October 23, 1922. Serial No. 596,258.

This invention relates to a device for separating a measured quantity of liquid and for spraying this liquid into a space where it is to be utilized.

There are many processes, especially those of a chemical nature, where it is essential to combine a definite quantity of liquid with a quantity of matter, and where even relatively small variations of the desired quantity cause either a failure in the process or inefficiency, and may indeed cause the final product to have relatively poor quality. Examples where such conditions exist are in certain steps in the refining of sugar. Thus when the massecuite is washed in a centrifugal, the amount of water that should be added thereto depends upon the amount of massecuite present. The massecuite is a syrupy mass in which the sugar is intimately associated with impurities, and if too much water be added to such a material, an objectionably large quantity of sugar would be dissolved by the water. On the other hand, too little water will prevent the thorough washing out of the impurities. It is one of the objects of my invention to provide an adjustable measuring tank which may be relied upon to supply a predetermined quantity of liquid whenever it is employed.

In sugar refining especially, the delivered water is preferably discharged as a spray into the material treated. It is another object of my invention to provide an efficient and reliable spraying device in connection with the measuring tank.

It is still another object of my invention to provide a measuring device and sprayer that may both be controlled by the movement of a single operating member, such as a handle.

It is still another object of my invention to provide a measuring tank and a sprayer operating by compressed air, so arranged that a single movement of an operating member will cause the spraying of a definite amount of liquid from the tank and the automatic refilling of the tank, so that the apparatus will be finally left in a condition ready to spray another definite amount of liquid, should the operating member be again moved.

My invention possesses other advantageous features, some of which with the foregoing, will be set forth at length in the following description, where I shall outline in full those forms of the invention which I have selected for illustration in the drawings acompanying and forming part of the present specification. Although in the drawings I have shown several embodiments of my invention, I do not desire to be limited thereto, since the invention as expressed in the claims may be embodied in other forms also.

Referring to the drawings:

Fig. 5 is a sectional view of another form of operating mechanism embodying my invention.

Figure 1:
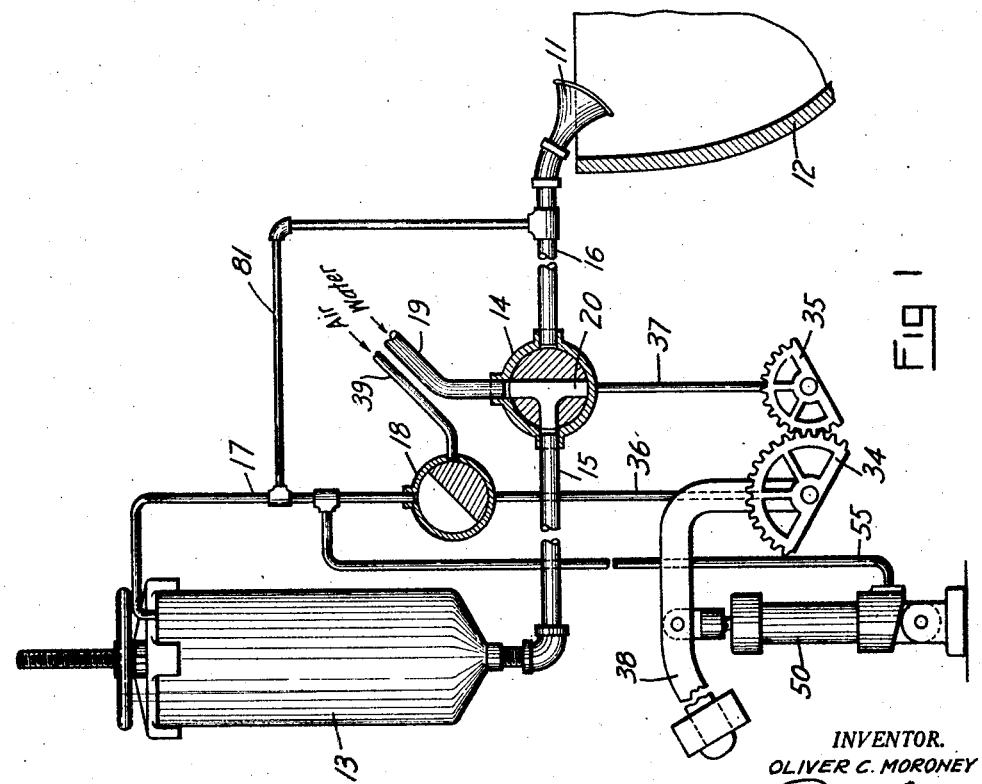
Figure 1 is a diagrammatic assembly view of the complete tank and sprayer and its operating mechanism, embodying my invention.

In the embodiment of my invention shown in Fig. 1, a measured quantity of water is adapted to be sprayed through a spraying nozzle 11, into a revolving washer 12. In this washer such material as massecuite may be placed, so as to be subjected to the separating action of centrifugal force. The water is supplied from a measuring tank 13, preferably through a three-way valve 14 shown diagrammatically only and through connecting pipes, such as 15 and 16. The water may be discharged from the bottom of the tank 13, and gravity alone may serve to send it as a spray through nozzle 11. I prefer, however, to provide a much better spraying action by using pressure to force the water through the nozzle 11. For this purpose compressed air is admitted into the top of tank 13, through the connection 17, whenever the tank is discharging. The control for the air is effected by the aid of a valve 18, also shown diagramamtically in Fig. 1. The filling of the tank is accomplished when the three-way valve 14 is in one of its two operative positions, the filling position being diagrammatically shown in Fig. 1, the water supply coming through a pipe 19. To make the tank discharge, the valve 14 is placed in its other operative position; in Fig. 1, by turning valve 14 in a counterclockwise direction until passage 20 connects pipes 15 and 16; and in this position the filling pipe 19 is closed. Before attempting to describe the manner in which actual embodiments of the valves 14 and 18 may be operated to perform their desired functions, it is advisable to describe in detail the operation of the filling tank 13.

Figure 2:
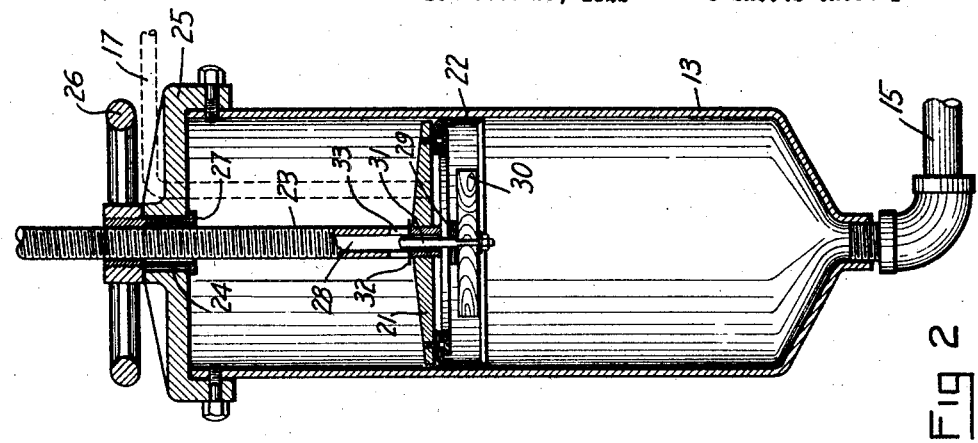
Fig. 2 is a longitudinal sectional view of the measuring tank shown in Fig. 1.

An embodiment of this tank is shown in greater detail in Fig. 2, in which there is shown the piston 21 capable of being adjusted within the tank to determine its capacity. Thus the farther away this piston is from the bottom of the tank, the more liquid is permitted to enter through the pipe 15. A cup leather 22 may be provided to insure a tight fit between the piston 21 and the inside of tank 13. In order to provide for adjustment of the piston 21, it may be mounted on a threaded stud 23. This stud is threaded through a bushing 24 loosely mounted in a crow-foot support 25 attached to the top of the tank 13. That end of the bushing 24 which projects outwardly of the tank 13 is adapted to be rotated manually as by the aid of the hand wheel 26 appropriately fastened to the bushing. The axial position of the bushing 24 is fixed, due to the provision of flange 27 on the lower side of the bushing, which flange engages the bottom surface of the support 25. On the top surface of this support, the hub of hand wheel 26 serves as the limiting member, and in this way, rotation of the bushing must result in a raising or lowering of the piston 21. The hand wheel thus serves as a convenient device for determining the quantity of liquid which the tank will hold.

In order to permit the liquid to rise in tank 13, it is of course essential that a vent hole be provided in piston 21. Furthermore, in order to prevent the liquid from rising over the piston, this hole must be closed as soon as the level of the piston is reached. A vent hole 28 is provided through the stud 23, which is adapted to be closed by a float valve 29. This valve is made of yielding material such as rubber, and is carried by the float 30 having a specific gravity less than that of the liquid, so that upon rising of the liquid to a sufficient degree, this float will urge the valve 29 on its seat and close the vent 28. The valve 29 may be guided in its movement by the aid of a rod 31 secured to the float 30 and projecting within the vent hole 28. A pin 32 passes through this rod beyond the upper surface of piston 21, and is disposed within slots 33 formed in stud 23. This pin prevents possible disengagement between rod 31 and stud 23, and also prevents the valve parts from dropping down into the bottom of the tank 13. From the foregoing disclosure it is evident that the liquid can rise only just far enough to cause the closing of the vent hole 28 by the aid of the valve 29.

When the tank 13 is discharging through pipe 15, compressed air is permitted to act on the liquid through the pipe 17 which enters into an aperture in piston 21. While the air pressure is maintained in the tank, the valve 29 remains closed. This is due to the fact that there is greater effective area on the bottom of float 30 against which the air pressure can act, than on the top surface. This difference is occasioned by the covering up of some of the upper surface by the valve 29. As soon as the tank 13 is completely discharged, the air pressure is released through nozzle 11, and the float 30 drops to the position shown in Fig. 2. A new charge of liquid may now be taken up by the tank, and for this purpose the valve 14 is placed to the filling position shown in Fig. 1, the valve 18 being closed immediately prior thereto.

The operation of valves 14 and 18 to perform the discharging and the recharging of the tank 13, is synchronized by proper mechanical connections, so that air valve 18 is closed while the tank is charged, but is opened as soon as valve 14 is moved to permit the tank to discharge. In one form of my invention, this synchronization is readily and easily effected by providing gear segments 34 and 35 connected respectively to the stem 36 of valve 18, and to the stem 37 of valve 14. An operating lever 38 connected to one or the other of the segments forms a convenient means for operating both valves simultaneously. Thus if this lever be rotated in a clockwise direction from that shown in Fig. 1, valve 18 will be opened to permit air to flow from supply pipe 39 to the tank 13 and valve 14 will move to connect pipes 15 and 16, and to shut off supply pipe 19. Conditions are thus correct for the discharge of the tank. To refill the tank, the operating lever 38 is returned to the position shown in Fig. 1, in which position the air pressure is shut off, and supply pipe 19 connected to pipe 15. In this movement, air valve 18 is closed before valve 14 is in position to refill, in order that there be no pressure in the tank against refilling. The tank 13 will then fill as far as the piston 21, and after that the flow of liquid will stop.

Figure 3:
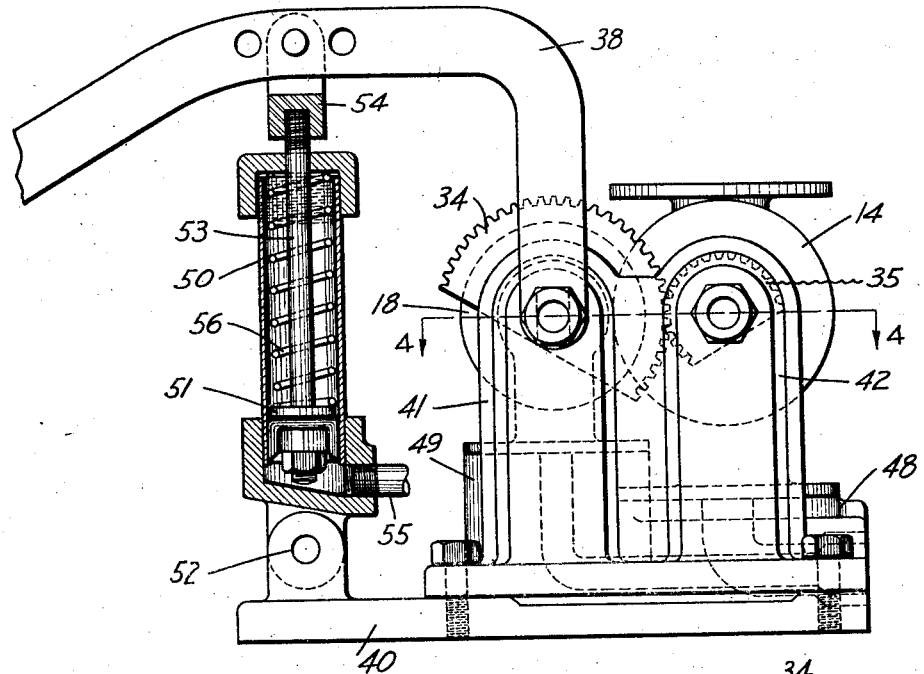
Fig. 3 is a side view, partly in section, of one form of the operating mechanism shown diagrammatically in Fig. 1.
Figure 4:
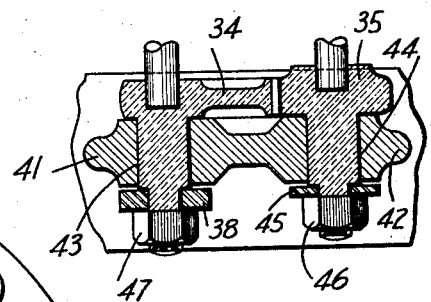
Fig. 4 is a sectional view along line 4—4 of Fig. 3.

The showing of the control mechanism in Fig. 1 is diagrammatic. Figs. 3 and 4 show one form this mechanism may take in greater detail. A standard or pedestal 40 which may be appropriately made from a casting serves to accommodate the bearing supports 41 and 42 for the gears 34 and 35. These gears have shank portions 43 and 44 which are journaled in the supports 41 and 42. A washer 45 and nut 46 serve to limit the axial movement of gear 35 with respect to its support. The operating lever 38 is attached to the other gear 34 by the aid of the nut 47. The valves 14 and 18 are appropriately supported on raised bosses 48 and 49 on the standard 40. This standard may also be appropriately apertured for connection to the various pipes used in the arrangement.

Operating on the lever 38 is an auxiliary cylinder 50 and piston 51. This cylinder is pivoted on the standard 40 at 52, and the piston rod 53 is pivoted by the aid of clevis 54 to the lever 38. The cylinder 50 is adapted to maintain the lever 38 in a raised position during discharge, and to permit this lever to drop as soon as the tank is emptied. In this way it is necessary to perform but one movement of the lever 38 manually, that of raising it. To effect this result, the bottom of the cylinder 51 is connected, as by pipe 55, to the pipe 17. Therefore as long as pressure exists in this pipe 17, the lever 38 remains raised. The pressure reduces as soon as all the water is driven out of nozzle 11, and when this occurs, the spring 56 in cylinder 50 urges piston 51 down into the position shown in Fig. 3. The lever 38 is correspondingly depressed, with attendant appropriate operation of the valves 14 and 18. In a short time the tank 13 is again ready to be discharged, and a mere raising of the lever 38 is sufficient to start the cycle just described.

From the foregoing description, the operation of the device is apparent. Assuming that the tank 13 is full and that float valve 29 is closed as it should be, a discharge and refilling of the tank may be caused by a raising of lever arm 38. This at first causes the admission of air under pressure into the tank 13 through pipe 17, as well as an unobstructed passage between tank 13 and nozzle 11. The pressure in pipe 17 causes the piston 51 in cylinder 50 to maintain rod 38 raised. As soon as the liquid is all out of tank 13, the pressure is reduced, arm 38 drops, and valves 14 and 18 are returned to the filling position. On the reduction in air pressure in tank 13, the float valve 29 opens and liquid is taken in from pipe 19 and through pipe 15. As soon as the level of the liquid causes float valve 29 to close, the tank is again ready for discharging by means of a manual operation of lever 38.

Figure 6:
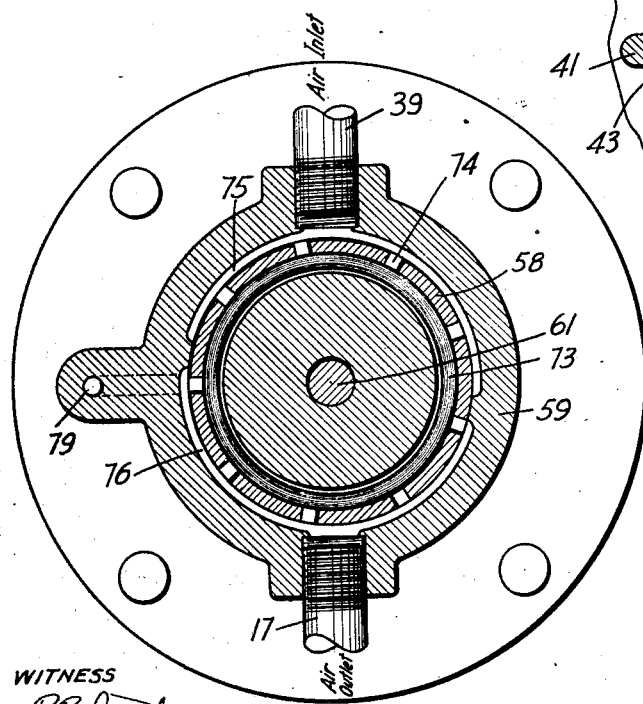
Fig. 6 is a sectional view along plane 6—6 of Fig. 5.

Another embodiment of the control valves shown diagrammatically in Fig. 1 is illustrated in greater detail in Figs. 5 and 6. As before, movement of a single lever 57 operates the air and water valves for charging and discharging. In this instance the valves are in the form of a compound piston valve operating in a common cylinder sleeve or liner 58. This sleeve may be appropriately held in a cylinder body casting 59. The operating lever 57 is connected, as by a clevis 60, to the piston rod 61 extending through the cylinder head 62. The sleeve 58 may be readily removed if occasion requires, by the aid of apertures 63 in the sleeve near the top thereof.

An upper piston 64 and a lower piston 65 both fastened to the rod 61 serve to control the water for filling and emptying the tank 13. For this purpose there is a water inlet 66 which may communicate, by the aid of the circular chamber 67 and apertures 68, in sleeve 58, with the interior of this sleeve. The apertures 68 in the position shown are open, since piston 65 is below them. The water is therefore free to pass up the sleeve 58, through apertures 69 and chamber 70, to filling pipe 15. The discharge pipe 16 may be placed in communication with the interior of sleeve 58 by the aid of annular chamber 71 and apertures 72 in the sleeve 58, but in the filling position shown, the piston 64 covers these apertures 72, and therefore discharge of the tank 13 is not permitted. In order to discharge the tank 13, the lever 57 is raised. This causes the water inlet apertures to be covered by piston 65, and the apertures 72 to the be uncovered by piston 64. The water from the tank can then flow through pipe 15, chamber 70, apertures 69, sleeve 58, apertures 72, chamber 71, and through pipe 16 to the spraying nozzle 11. To discontinue the discharge, the piston rod 61 is lowered by the aid of lever 57 into the position shown in Fig. 5.

The control of the air into the top of tank 13 is also effected by movement of the lever 57. For this purpose the lower portion of piston 65 is extended to form virtually a third piston 73, which in the position shown in Fig. 5 is opposite apertures 74 in the sleeve 58. As shown in greater detail in Fig. 6, some of these apertures are in communication with a chamber 75 which in turn is in communication with the air inlet pipe 39, while others of the apertures 74 are in communication with chamber 76, which in turn is in communication with the air outlet pipe 17. While the piston 73 is in the position shown, it is evident that the passageway between pipes 39 and 17 is blocked, while if the piston rod 61 is moved upwardly to discharge the tank 13, this passageway is free across the sleeve 58.

While the tank 13 is discharging in this form of the invention, air pressure exists under piston 73 and maintains rod 61 in raised position. However, as soon as discharging is complete, this air pressure is reduced, and a spring 77 acting on the piston rod 61 serves to restore the apparatus to the filling position of Fig. 5. In order to permit the pistons to move down completely, a small vent hole 78 may be provided, which hole serves to relieve any back pressure on piston 73 when it moves downward. This hole, being so small, has substantially no effect upon the air pressure when the air passages are opened by an upward movement of the piston rod. It is thus seen that substantially the same automatic operation is accomplished in this form of the apparatus as that illustrated in Figs. 3 and 4.

In order to cause a still better spraying action, I preferably provide for admission of air under pressure directly into discharge pipe 16. For this purpose an air passage 79 is provided between chamber 76 and the pipe tap 80 for the pipe 16. In this way an aerated stream, much better in its effect, is produced from nozzle 11.

In the form shown in Fig. 1, a similar aerating effect may readily be obtained by the aid of a small pipe 81 connecting pipe 17 with pipe 16, so that while air valve 18 is open for discharging the water in tank 13, compressed air is also forced through pipe 81.

I claim:

1. In a measuring tank, a vessel for holding a liquid, a valve for controlling the charge and discharge of the liquid, means for admitting a gas under pressure into the stream of liquid after it leaves the vessel, and means for simultaneously operating the controlling valve and said gas admitting means.

2. In combination, a measuring tank, means forming a valve chamber, and adapted to be connected to a source of liquid supply, means forming a pair of passageways connected to said chamber, one of said passageways leading to the tank, and the other forming an outlet for the tank, and a pair of connected pistons axially movable in the chamber for alternately opening that passageway forming the outlet while interrupting the connection to the liquid supply, and vice versa.

3. In combination, a measuring tank, means forming a valve chamber, and adapted to be connected to a source of liquid supply, means forming a pair of passageways connected to said chamber, one of said passageways leading to the tank, and the other forming an outlet for the tank, a pair of connected pistons for alternately opening that passageway forming the outlet while interrupting the connection to the liquid supply, and vice versa, and means for conducting air under pressure to act on one of the pistons for maintaining it in that position in which the outlet passageway is open.

4. In combination, a measuring tank, means forming a valve chamber, and adapted to be connected to a source of liquid supply, means forming a pair of passageways connected to said chamber, one of said passageways leading to the tank, and the other forming an outlet for the tank, a pair of connected pistons for alternately opening that passageway forming the outlet while interrupting the connection to the liquid supply, and vice versa, and means mechanically connected to the pistons for opening a passageway from a source of gas pressure to the measuring tank when the tank outlet is open, whereby the pressure of said gas serves to maintain the pistons in discharging position until the tank is empty.

In testimony whereof, I have hereunto set my hand.

OLIVER C. MORONEY.